April 18, 1961  E. P. MOSLO  2,979,772
PLASTICIZING HEAD
Filed Sept. 11, 1958  3 Sheets-Sheet 1
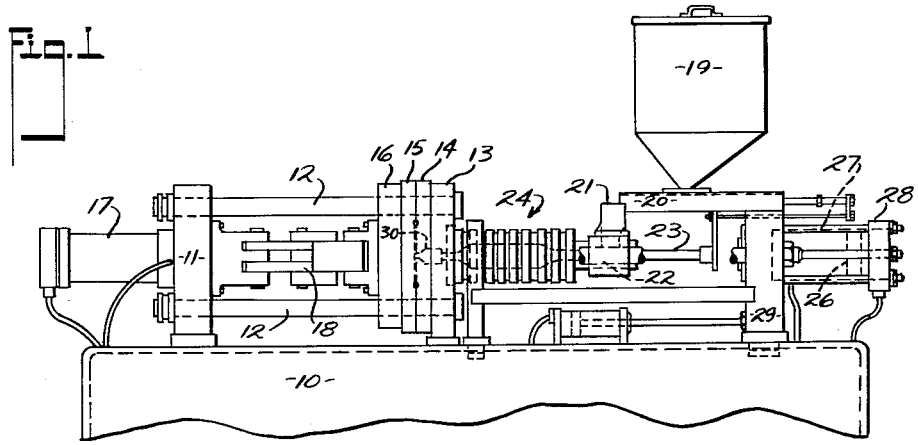
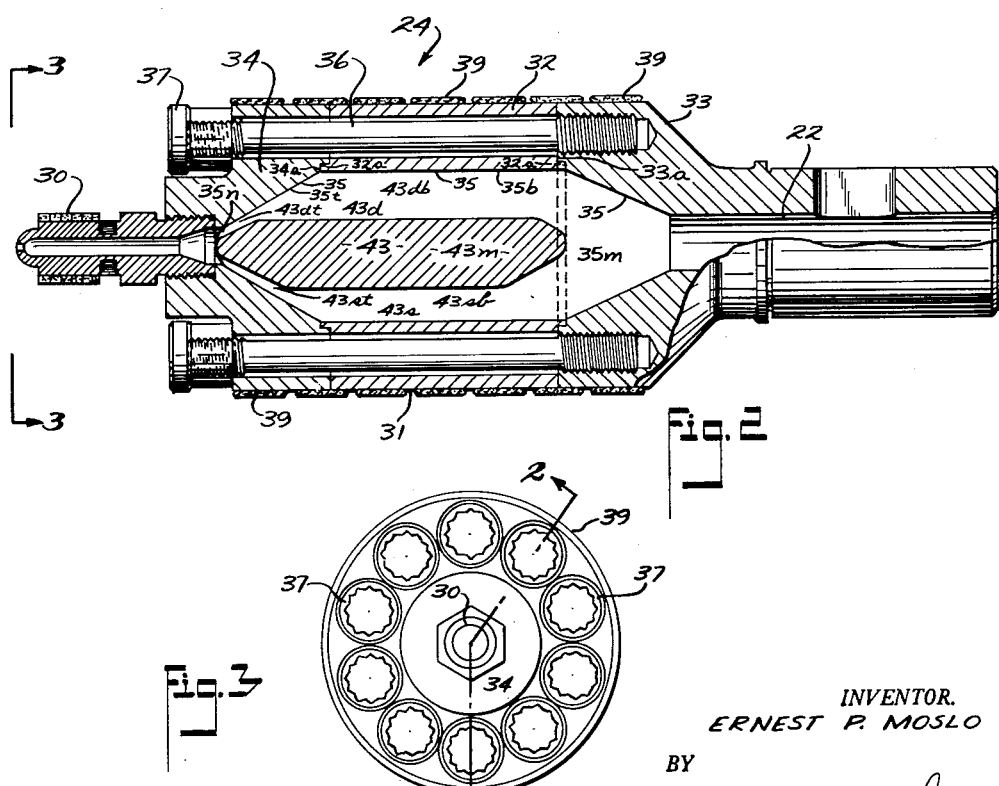
INVENTOR.
ERNEST P. MOSLO
BY
Hyde, Meyer, Baldwin & Doran
ATTORNEYS

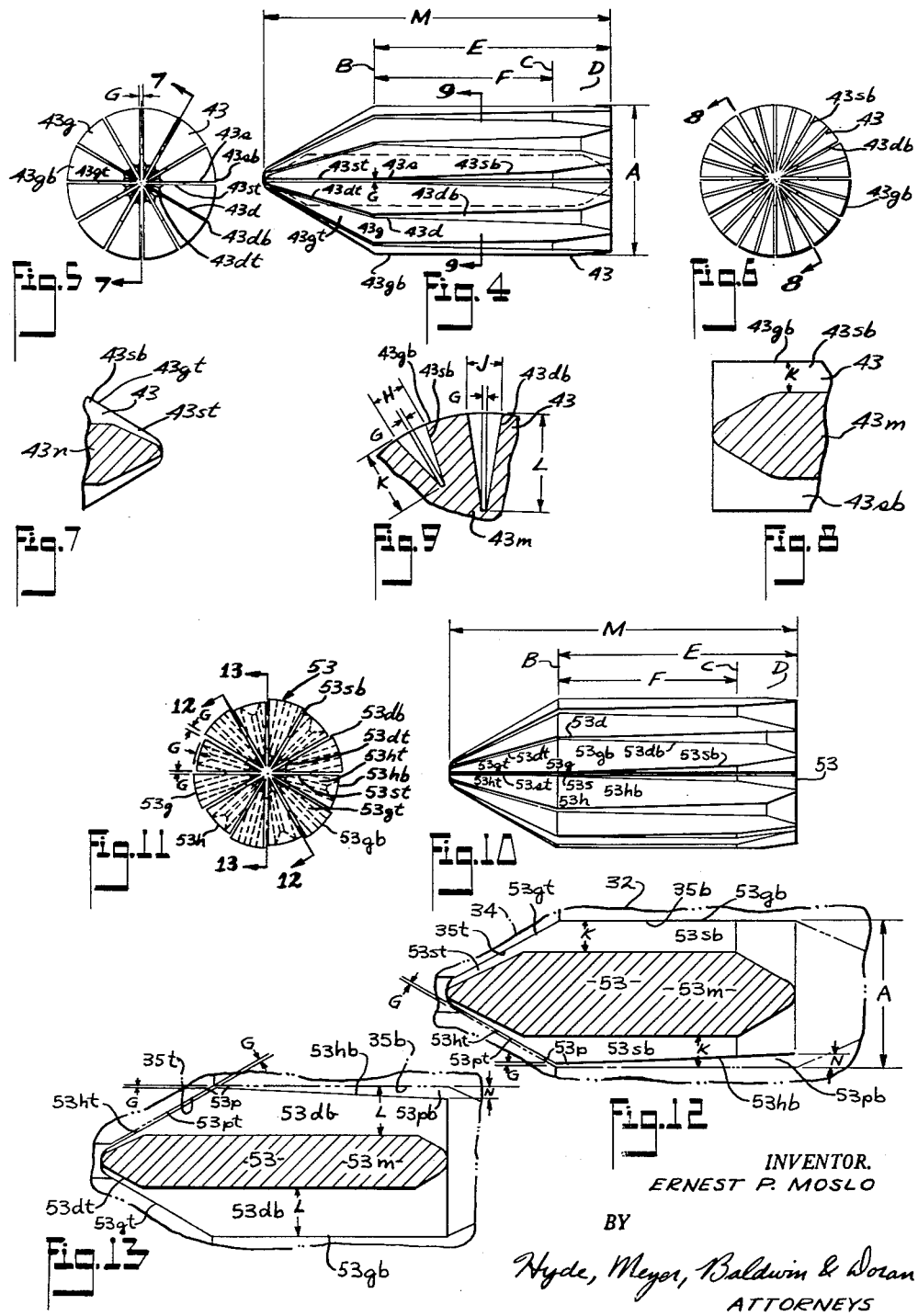

April 18, 1961 E. P. MOSLO 2,979,772
PLASTICIZING HEAD
Filed Sept. 11, 1958 3 Sheets-Sheet 3
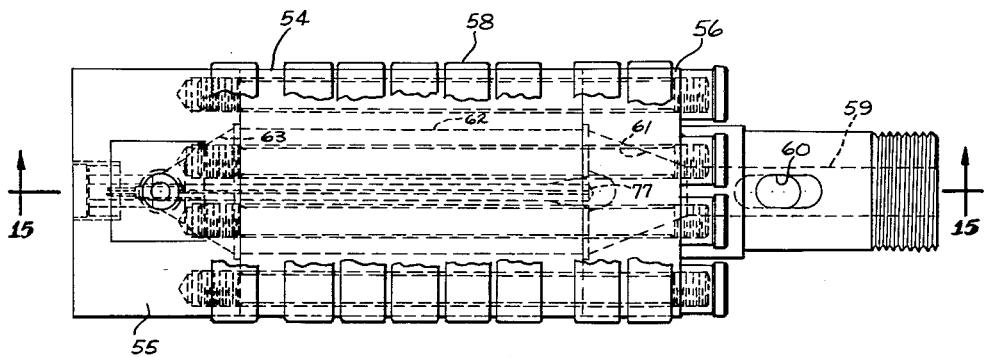
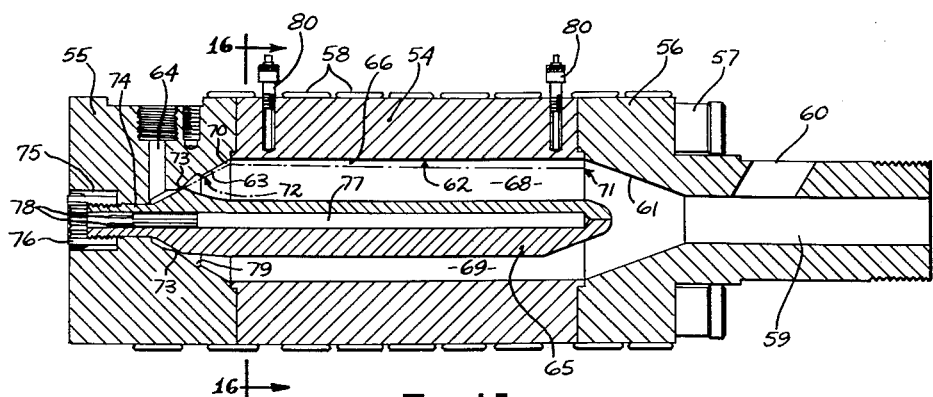
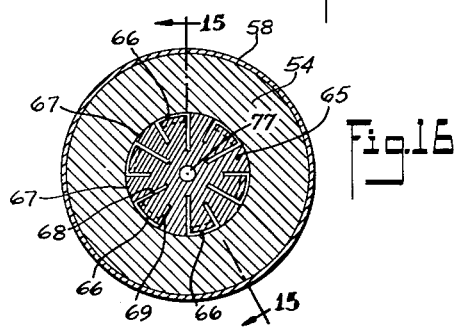
INVENTOR.
ERNEST P. MOSLO
BY
Hyde, Meyer, Baldwin & Doran
ATTORNEYS United States Patent Office 2,979,772
Patented Apr. 18, 1961

2,979,772

PLASTICIZING HEAD

Ernest P. Moslo, 11720 Edgewater Drive, Lakewood, Ohio

Filed Sept. 11, 1958, Ser. No. 760,428

1 Claim. (Cl. 18—30)

This invention relates to improvements in a plasticizing head or heating chamber for heating plastic molding material in a plastic molding machine and more particularly to spreaders therefor.

One of the objects of the present invention is to provide a plasticizing head characterized by its low back pressure, low heating temperature, even heating of the molding material with minimum excess temperature, keeping the plastic under heat for a minimum time, uniform flow velocity, and minimizing sliverstreaking and the chance of any cold plastic slug slipping through the heating chamber into the mold cavity.

A further object of the present invention is to provide a plasticizing head characterized by its low manufacturing cost, ease of assembly of its component parts, structural simplicity, rapid and efficient heat transfer, and operating efficiency.

Other features of this invention reside in the arrangement and design of the parts for carrying out their appropriate functions.

Other objects and advantages of this invention will be apparent from the accompanying drawings and description and the essential features will be set forth in the appended claim.

In the drawings,

Fig. 1 is a side elevational view of an injection molding machine adapted to use the plasticizing head disclosed hereinafter;

Fig. 2 is a longitudinal sectional view through the outer heating element of the heating chamber or plasticizing head disclosed in Fig. 1 taken along the line 2—2 of Fig. 3 and through the spreader along one shallow radial passageway and one deep radial passageway in a manner similar to line 7—7 in Fig. 5;

Fig. 3 is an end view of the heating chamber in Fig. 2 taken along the line 3—3 of Fig. 2;

Fig. 4 is a side elevational view of the spreader removed from the heating chamber in Fig. 2;

Fig. 5 is an end view taken from the left looking toward the right at the spreader in Fig. 4;

Fig. 6 is an end view of the right hand end of the spreader in Fig. 4 looking toward the left;

Fig. 7 is a sectional view of a portion of the discharge end of the spreader taken along the line 7—7 of Fig. 5;

Fig. 8 is a sectional view of a portion of the inlet end of the spreader taken along the line 8—8 of Fig. 6;

Fig. 9 is a transverse sectional view taken through the spreader along the line 9—9 of Fig. 4 but enlarged to twice the size of Fig. 4;

Fig. 10 is a side elevational view of a second form of spreader adapted to be inserted into the heating chamber of Fig. 2 in place of the spreader in Fig. 4;

Fig. 11 is an end view of the left hand end of the spreader in Fig. 10 looking from the left toward the right;

Fig. 12 is a sectional view taken along the line 12—12 of Fig. 11;

Fig. 13 is a sectional view taken along the line 13—13 of Fig. 11;

Fig. 14 is a top plan view of a modified form of a heating or plasticizing chamber embodying my invention;

Fig. 15 is a sectional view of the same taken along the line 15—15 of Fig. 14; while Fig. 16 is a transverse sectional view taken along the line 16—16 of Fig. 15.

Before the plasticizing head here illustrated is specifically described, it is to be understood that the invention here involved is not limited to the structural details or arrangement of parts here shown since plasticizing heads or heating chambers embodying the present invention may take various forms. It is also to be understood that the phraseology or terminology herein employed is for purposes of description and not of limitation since the scope of the present invention is denoted by the appended claim.

While the disclosed invention may be carried out utilizing any suitable injection molding machine, one suitable machine has been shown in Fig. 1 for carrying out my invention. This comprises a base 10 to which are fixed end frame members 11 and 13 which are fixed together in a rigid frame by four parallel rods 12. Mounted on the frame and in order from the plate 13 toward the left as viewed in Fig. 1, there is a front cavity plate 14, a rear cavity plate 15 and a support plate 16 slidable on rods 12. The cavity plates 14 and 15 have registering recesses, and when brought together as shown in Fig. 1, these provide a cavity for an article to be molded.

Means are provided for moving the plates 15 and 16 along rods 12 away from the plate 14 in the usual manner to open and close the die cavity so that a molded article may be removed. This die clamping mechanism comprises a cylinder and piston motor 17 secured to the frame member 11 and having its piston connected with toggle mechanism 18 in turn connected with plate 16. Motive fluid is supplied to one end of the cylinder 17 under suitable controls (not shown) so that hydraulic fluid drives this piston toward the right as viewed in Fig. 1 to exert a clamping action clamping the die cavity plates 14 and 15 tightly together. When the die cavity is to be opened, then hydraulic pressure fluid is reversed in cylinder 17 to drive its piston toward the left as viewed in Fig. 1 to move plates 15 and 16 toward the left and to open the die cavity.

The construction in Fig. 1 operates in a conventional mode of operation. Solid plastic in a finely divided form is fed from a main hopper 19 through a pusher chamber 20 to a transfer hopper 21 where it drops into a chamber 22 just ahead of ram 23 which serves to carry the solid, finely divided, synthetic resin material into the hollow of heating chamber or plasticizing head 24 where it gradually becomes flowable as it moves in the leftward direction toward the exit end of the chamber. Ram 23 is driven by piston head 26 which is reciprocable in a chamber 27 of a cylinder 28 rigidly mounted on the member 29. Hydraulic pressure fluid is provided to opposite ends of the cylinder 28 in the usual manner under suitable controls for reciprocating its piston and causing ram 23 to force material through heating chamber 24 and out through nozzle 30 into the mold cavity in the usual manner.

Plasticizing head or heating chamber 24 is provided for heating the plastic molding material in hopper 19 up to a suitable temperature for injection molding into the die cavity between plates 14 and 15. This head 24 includes in Fig. 2 a heating chamber element 31 comprising annular sleeve member 32, inlet end member 33 and discharge end member 34 suitably secured together with each of these members being made of steel or other suitable heat conductive material. These members have an axial bore 35 therethrough forming respectively in members 32, 33 and 34 middle, rear, and front material heating chambers. Bore 35 has an inlet end 35m and a discharge end 35n, a cylindrical portion 35b in member 32 and tapered portion 35t in member 34. A plurality of axially extending studs 36 are circumferentially spaced around a circle, here shown as 10 studs in number, and extend through aligned bores in members 32, 33 and 34 with the right end of each stud screwed into a threaded hole in the bore of member 33. A nut 37 is screwed on the threads at the left end of each stud in Fig. 2 to pull the members 32, 33 and 34 axially into the assembled position in Fig. 2. The annular and cylindrical male and female surfaces 32a, 33a and 34a on these respective members telescopically associate together to laterally locate the members and to provide a seal against leakage from bore 35.

Within bore 35 is mounted spreader element 43 or 53 constructed according to this invention. Spreader element 43 is shown in Figs. 2 and 4, but it should be clearly understood that spreader element 53 from Fig. 10 may be readily substituted in place thereof in bore 35. Either spreader element, when in the assembled position of Fig. 2, will be mounted in the bore 35 in good thermal contact with the respective cylindrical and tapered surfaces 35b and 35t. Then, heat, supplied by the annular heater bands or heating means 39 in Fig. 2, surrounding and connected to the outside of the heating chamber element members 32, 33 and 34, will provide heat for heating element 31, and by conduction through surfaces 35b and 35t, the spreader 43 or 53. Good thermal contact is provided by having the periphery of the spreader 43 or 53 of such a diameter to give a force fit thereof within bore 35.

Now, it should be apparent that as the piston 23 reciprocates, it will force the plastic material axially toward the left in Fig. 2 through the bore 35 and through the plurality of passageways in spreader element 43 or 53 extending through this bore 35 from the inlet end to the discharge end thereof.

Spreader element 43 is shown in detail in Figs. 2 and 4–9. This spreader element is an integral member made of steel or other suitable heat conductive material. The spreader element has shallow radial passageways 43s and deeper radial passageways 43d extending throughout the axial length of the spreader element with these passageways arranged alternately and here shown spaced at 30 degree angles about the circumference of the spreader element. Referring to Fig. 9, it is obvious that if the shallower radial passageway 43sb were as deep as the passageway 43db, then the spreader element 43 would be greatly weakened at the center. By inserting a shallower radial passageway between each pair of deeper radial passageways I provide a very large area for heating the synthetic resin material without weakening the spreader member. Passageways 43s and 43d have respectively passageway portions 43sb and 43db coacting with the bore 35b in element 32 of Fig. 2 and have respectively passageway portions 43st and 43dt coacting with bore tapered portion 35t in element 34 to form the complete channels for flow of the plastic material from the inlet end 35m to the discharge end 35n of the plasticizing cylinder 24 in Fig. 2. A solid center core 43m prevents fluid communication between the inner ends of these passageways 43d and 43s along the length of the spreader element. Reference numeral suffixed s, d, b and t have been used to designate shallow, deep, bore aligned and taper aligned passageway portions with the suffix letters being the first letters of these respective words.

The periphery of the spreader element includes arcuately spaced apart bore peripheral portions 43g contacting the surface of the heating element bore 35 at a given radius the same as bore surface 35b. These peripheral portions 43g have respectively bore peripheral portions 43gb laterally aligned with bore portion 35b in Fig. 2 and portions 43gt laterally aligned with bore portion 35t in Fig. 2. In Figs. 4–9, these bore peripheral portions 43g form a continuous circle except for the gaps provided by their radial passageways 43s and 43d. These radial passageways and peripheral portions are equal in number with each pair of adjacent, 30-degree-related, radial passageways 43d and 43s having located therebetween one of these peripheral portions 43g.

Spreader element 53 is shown in detail in Figs. 10–13 and will be assumed to be located in bore 35 in Fig. 2 in place of spreader element 43. This spreader element is an integral member made of steel or other suitable heat conductive material. The spreader element has shallow radial passageways 53s and deeper radial passageways 53d extending throughout the axial length of the spreader element with these passageways arranged alternately and spaced at 30 degree angles about the circumference of the spreader element. Passageways 53s and 53d have respectively passageway portions 53sb and 53db coacting with the bore 35b in element 32 of Fig. 2 and have respectively passageway portions 53st and 53dt coacting with bore tapered portion 35t in element 34 to form the complete channels for flow of the plastic material from the inlet end 35m to the discharge end 35n of the plasticizing cylinder 24 in Fig. 2. A solid center core 53m prevents fluid communication between the inner ends of these passageways 53d and 53s along the length of the spreader element.

The periphery of the spreader element includes arcuately spaced apart and alternately arranged bore peripheral portions 53g and passageway peripheral portions 53h. Portions 53g contact the surface of the heating element bore 35 at a given radius the same as bore surface 35b, and portions 53h are located at a radius smaller than said given radius. These peripheral portions 53g and 53h have respectively bore peripheral portions 53gb and 53hb laterally aligned with bore portion 35b in Fig. 2 and portions 53gt and 53ht laterally aligned with bore portion 35t in Fig. 2. In Figs. 10–13, the passageway peripheral portions 53h form arcuately spaced peripheral passageways 53p with each of these passageways extending from the inlet end 35m to the discharge end 35n and being located between the passageway peripheral portion 53h and the surface of bore 35 of heating element 31. The spreader element 53 has opposite arcuate ends of each peripheral passageway 53p opening into adjacent radial passageways 53s and 53d. Each peripheral passageway 53p includes a portion 53pb aligned with bore 35b in Fig. 2 and tapering in radial thickness in its advancing direction toward the left in Figs. 12 and 13, and a portion 53pt of uniform thickness aligned with bore portion 35t.

The spreader elements 43 and 53 are drawn approximately to scale but with the scale of Fig. 9 being twice the scale of the other figures of the drawings.

It has been found that spreader elements 43 and 53 with the following approximate dimensions give desirable operating characteristics, as mentioned in more detail in other parts of this description, it being understood that dimensions like "A" and "M" depend upon the capacity of the machine:

$A = 3\frac{3}{4}''$
$E = 6''$
$F = 4\frac{9}{16}''$
$G = \frac{1}{16}''$ or smaller (preferred)
$H$ = tapers from $\frac{1}{16}''$ to $\frac{13}{32}''$ between lines B and C
$J$ = tapers from $\frac{1}{16}''$ to $\frac{7}{16}''$ between lines B and D
$K = 1\frac{13}{16}''$—depends on diameter of head
$L = 1\frac{1}{4}''$—depends on diameter of head
$M = 8\frac{3}{4}''$—depends on plastic capacity
$N = \frac{5}{16}''$—varied as desired.

It has also been found that dimension G may increase in size up to approximately $\frac{3}{32}$ inch and desirable results will still be obtained. This dimension is critical and should not be greater than $\frac{3}{32}$ inch. It should be noted that the section Fig. 9 through spreader element 43 is approximately the same as the corresponding section through spreader element 53, and although dimensions F, H and J may vary slightly between the two spreader elements because of the difference in radial location of peripheral portions 53h and 43g, these dimensions are approximately the same for both spreader elements 43 and 53.

Many generic concepts are found in both spreader elements 53 and 53. The passageways 43d, 43s, 53d, 53s and 53p are arcuately spaced apart. Radial passageways 43d, 43s, 53d and 53s extend radially inwardly from the periphery of their associated spreader elements with each spreader element having alternate radial passageways 43d or 53d extending radially inwardly to a deeper depth than the radial passageways 43s or 53s located therebetween. Each radial passageway 43d, 43s, 53d and 53s decreases in transverse or arcuate dimension between opposite walls as it extends in the inward direction away from the heating bands 39. Each spreader element includes a solid center portion or core 43m or 53m preventing, along the length of its spreader element, flow between these radial passageways at the radially inward ends thereof most remote from the heating bands 39. This construction provides more uniform heating to the material because the portion of the spreader element 43 or 53 most removed from the heating band 39 will probably be at a lower temperature because it receives its heat by conduction from the heating bands. A careful consideration of the previously mentioned dimensions of the spreader elements will reveal that each spreader element 43 or 53 has a passageway, such as passageway portions 43st, 53st, and/or 53pt not over 3/32 inch between opposite walls in at least one transverse dimension for at least approximately one-third of the axial length of the spreader element measured upstream from the discharge end 35n thereof. It should be noted that the ratio of dimensions $$(M-E)/M = 0.32$$

or approximately one-third. Also, while these following dimensions are not critical, each passageway (passageway 43d, 43s, 53d, 53s and/or 53p) is not over 1½2 inch between opposite walls in at least one transverse dimension for at least 5/8 of the axial length of the spreader element 43 or 53 measured upstream from the discharge end 35n. It should be noted that the ratio of dimensions $(M-E+F)/M = 5/8$.

Each of these spreader elements 43 or 53 uses extremely narrow passageways to provide good, efficient and rapid heat transfer so as to heat the plastic material quickly up to proper molding temperature. It should be noted for example that to raise the average temperature of a slab of plastic to 450° F. when using a source of 500° F. against one side of the slab, it will take approximately 921 seconds for heating a slab ½ inch thick, 230 seconds for a slab ¼ inch thick, 14 seconds for a slab 1/16 inch thick, and 3.6 seconds for a slab 1/32 inch thick. Since the transverse dimension of portions or the passageways at G is 1/16 inch thick and since heating of the plastic is from both walls of the passageway, the rate of heating would correspond to this 3.6 seconds time, which is a very rapid rate of plastic heating.

An essential feature of the present invention is the provision of a plurality of passageways through which synthetic resin must travel while being plasticized with these passageways being not over 3/32 inch, as shown by dimension G, between opposite walls in at least one transverse dimension near the discharge end of the plasticizing head, and with these narrow passageways providing a substantial length through which the resin must travel whereby quick and thorough heating of the resin is accomplished. Then, if a large number of such narrow passageways is provided, there is very low resistance to the flow of resin through the heating head.

It should be noted that each spreader element 43 or 53, when inserted into the heating chamber element 31 in Fig. 2, will provide a plasticizing head or cylinder 24 with many desirable advantages. First, a minimum of excess temperature is required because of the rapid heat transfer. There is no danger of over heating the plastic or having the plastic exceed its maximum safe temperature by touching the hot walls of the passageways. A low heating temperature may be used while proper mold filling is still obtained. A great number and length of thin passageways permits the plasticizing head 24 to be of large flow capacity while using a low operating temperature. Also, the narrowness of the passageways tends to heat the plastic material partially by friction to add to its temperature without raising the temperature of the heating means 39. It has been found that it is not practical to soak plastic in thick sections to get a uniform temperature.

Second, the plastic is brought up to the proper molding temperature and the heating is uniform. The radial tapering of the radial passageways with converging walls in a direction away from the heater bands tends to provide more even temperature in the material. If any of the plastic material were below the minimum molding temperature, the cold slug of plastic might block the plastic flow, but this danger is eliminated by having uniform heating. Also, these tapered passageways prevent the material farthest from the heat source from having the lowest temperature, as is generally encountered.

Third, the plastic material is kept under heat for a minimum length of time since it flows quickly through the plasticizing head and is quickly melted in the narrow passageways. It has been found that plastic material will stand a critically high temperature for only a short period of time. If the soaking method in a big heating cylinder is used, some of the plastic will be at the high temperature all of this time and may be seriously damaged.

Fourth, the plasticizing head is designed to fill the mold quickly. If the mold is not filled quickly, a frozen skin will form, stresses will develop, and a poor surface finish will be obtained on the molded article. Hence, the plasticizing head must heat the plastic quickly to molding temperature with a minimum pressure loss. The advantages of heating with this plasticizing head have already been discussed. The plasticizing head has a minimum pressure loss, or a lower back pressure, than many cylinders. The passageway portions taper in the axial direction of plastic advance so that, when the material becomes more fluid, it can travel through a narrower opening and be brought up quickly to the molding temperature with a minimum of pressure loss.

Fifth, the plasticizing head provides uniform flow velocity since no corners interfere with steady flow. This prevents localized overheating, permits rapid change of color and/or type of material, etc. The many flow passageways provide a maximum flow area with rapid heat-up of the plastic.

Sixth, the plasticizing head provides minimum sliver-streaking because minimum gas or air is entrapped in the plastic between the plastic granules before melting in the narrow passageways.

Seventh, the plasticizing head provides minimum chance of a cold slug slipping by the heated surfaces into the nozzle 30 because the passageways are of such small cross section.

Another modified form of my invention is shown in Figs. 14, 15 and 16. Here the heating chamber is comprised of a generally cylindrical intermediate portion 54 having its hollow central bore closed by the end members 55 and 56. The end members are clamped tightly to the intermediate portion by means of a plurality of bolts 57 which are threaded into the end member 55 and carry nuts which engage against the outside of the member 56. Electrical heating elements 58 surround the outside of the heating head.

A through passageway is provided for synthetic resin material to pass through the heating chamber of the heating head. This comprises a cylinder 59 in which a piston normally operates to push the material through the heating head. Granular plastic resin material is fed through the opening 60 ahead of the piston (not shown). The passageway diverges at 61, then extends along the generally cylindrical bore 62, then converges at 63 to a discharge passageway 64.

A spreader element 65 is provided which in a number of ways resembles that shown in Figs. 11, 12 and 13. This spreader element has a plurality of generally axially extending circumferentially spaced material flow passageways 66 between the spreader element and the bore surface 62. Between these passageways, the arcuate surfaces 67 of the spreader element tightly engage the bore in the heater housing portion 54 so as to give good thermal contact there for heat exchange. The passageways 66 communicate with alternate deep and shallow radial passageways 68 and 69 respectively which extend along the entire cylindrical portions of the bore and spreader elements. These passageways 68 and 69 must not be over $3/32$ inch wide and preferably are $1/16$ inch in width or under. These passageways 68 and 69 may be widened out toward the upstream end of the spreader element as described in connection with Figs. 10 through 13 inclusive but when used for a partly plasticized material need not be so flared. Preferably the passageways 66 increase in radial depth from the point 70 to the point 71, as indicated by the dot-dash line. The passageways 66 continue down the conical nose at the left end of the spreader element 65 spaced from the conical surface 63 as indicated by the dot-dash line 72. These inclined passageways gradually converge toward the point 73 where the members 65 and 55 approach each other to a critical depth of between .015 inch and .030 inch, a preferred form having a depth here of .020 inch. It should be understood that the passageways indicated by the dot-dash line 72 of Fig. 15, extending down the conical nose of the spreader, are analogous to the passages extending along the conical portions 53$ht$ of the modification described in connection with Figs. 10 through 13.

Referring to Figs. 15 and 16, it should be recognized that the thin straining passageways at the points or zone 73 each extend 360 degrees around the conical nose of the spreader 65, the spreader nose portions between the passages indicated at 72 being slightly changed in taper so that the zone 73 is a thin annular slot completely around the nose of the cone with a uniform depth of .015 to .030 inch. It will be noted that just downstream from the zones 73, the flow is into the discharge passageway 64. The spreader member 65 is held in position as shown in Fig. 16 by means of an axial hollow neck 74 rigidly attached to the spreader member and extending into an outwardly opening recess 75 in the block 55. A nut 76 is threaded onto the end of the nose 74 and pulls the spreader member firmly up against those portions of the conical nose which engage tightly against the housing member 55 between the openings 72.

Preferably, although not necessarily, an additional electrical heating element 77 is provided extending axially through the spreader member 65 as seen in Figs. 15 and 16. Electrical conductors 78, serving the unit 77, extend outwardly through suitable openings at the left end of the spreader member extension 74 and through the nut 76.

Preferably, but not necessarily, an annular radially enlarged pocket 79 is provided around the conical surface 63 of the housing member 55. This pocket is just upstream from the openings 73 and holds a small pocket of fully plasticized material ready and available to go through the opening 73 when pressure is applied from the piston operating in cylinder 59.

The members 80 are thermocouple connections for controlling the supply of electricity to the heating bands 58.

It is thus clearly seen from Figs. 15 and 16 that this last embodiment as herein described provides a very large heating area along the passageways 66, 68 and 69, that the material in these passageways is never much more than $3/64$ inch away from a heated surface except as to those portions of passageways 66 which approach the point 71. It will also be noted from Fig. 15 that the radial inner bottom of each of the passageways 68 and 69 terminates close to one of the openings 73 so that all of the material passing through the passageways 66, 68 and 69 is discharged into the pocket 79 just ahead of the straining openings 73. These very small openings insure that no plastic particle of any size can reach the discharge passageway 64.

What is claimed is:

In a plasticizing head for heating plastic molding material for a plastic molding machine having a heating chamber element having an axial bore circular in cross-section with an inlet end and a discharge end, and there being a spreader element mounted in said bore in good thermal contact with said bore, and heating means connected to at least one of said elements; the combination therewith of said spreader element having a plurality of longitudinally extending passageways generally V-shape in section and opening radially outwardly at the periphery of said spreader element, a first set of said passageways extending radially deeply into said spreader element and being equally spaced circumferentially about the same, a second set of said passageways extending radially less deeply than the first set into said spreader element and spaced evenly between the passageways of the first set, all of said passageways extending from said inlet end to said discharge end and having the sections thereof converging toward the discharge end, whereby a large passageway area is provided without weakening said spreader element near its axis.

References Cited in the file of this patent

UNITED STATES PATENTS

| | | |
|---|---|---|
| 2,482,243 | Burnham | Sept. 20, 1949 |
| 2,669,750 | Keeney | Feb. 23, 1954 |
| 2,778,062 | Moslo et al. | Jan. 22, 1957 |